(12) United States Patent
Ito et al.

(10) Patent No.: US 7,556,234 B2
(45) Date of Patent: Jul. 7, 2009

(54) SEAT SLIDE DEVICE

(75) Inventors: Sadao Ito, Anjo (JP); Makoto Sakai, Kariya (JP); Eiichiro Tsuji, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 196 days.

(21) Appl. No.: 11/598,772

(22) Filed: Nov. 14, 2006

(65) Prior Publication Data
US 2007/0108360 A1 May 17, 2007

(30) Foreign Application Priority Data
Nov. 15, 2005 (JP) ............................. 2005-330818

(51) Int. Cl.
*F16M 13/00* (2006.01)
(52) U.S. Cl. .................... 248/429; 248/424; 297/330
(58) Field of Classification Search ................ 248/424, 248/429; 297/330, 311
See application file for complete search history.

(56) References Cited

U.S. PATENT DOCUMENTS 5,349,878 A * 9/1994 White et al. ............... 74/89.14
7,051,986 B1 * 5/2006 Taubmann et al. .......... 248/429
7,143,513 B2 * 12/2006 Taubmann et al. ......... 29/893.1
7,303,223 B2 * 12/2007 Nakamura et al. ....... 296/65.15
2008/0023613 A1 * 1/2008 Brewer et al. ............... 248/429

FOREIGN PATENT DOCUMENTS

| JP | 7-345 | 1/1995 |
|---|---|---|
| JP | 2000-158983 | 6/2000 |
| JP | 2002-192996 | 7/2002 |

* cited by examiner

*Primary Examiner*—Amy J. Sterling
(74) *Attorney, Agent, or Firm*—Buchanan Ingersoll & Rooney PC

(57) ABSTRACT

A seat slide device for a vehicle seat includes a lower rail fixed to a vehicle floor, a support bracket for supporting the vehicle seat, an upper rail fixed to the support bracket and slidably supported on the lower rail relative to the lower rail, a nut member fixed to the lower rail, a screw shaft engageable with the nut member and rotatably supported on the upper rail and a gear device supported on one end of the upper rail through a holdong bracket to transmit a rotational force from a power source to the screw shaft. The upper rail is movable relative to the lower rail in a front and backward direction relative to the seat by the engagement of the screw shaft with the nut member. The holding bracket is fixed to the upper rail and the support bracket for supporting a gear case of the gear device over a circumferential area of the gear case on front, rear, upper and lower surfaces in cooperation with the first support bracket.

8 Claims, 5 Drawing Sheets

SEAT SLIDE DEVICE

CROSS REFERENCE TO RELATED APPLICATION

This application is based on and claims priority under 35 U.S.C. §119 with respect to Japanese Patent Application 2005-330818, filed on Nov. 15, 2005, the entire content of which is incorporated herein by reference.

FIELD OF THE INVENTION

This invention generally relates to a seat slide device, and more particularly, to a seat slide device for sliding a vehicle seat relative to a vehicle floor by driving a motor as a power source.

BACKGROUND

As one of the conventional seat slide devices, there is proposed a seat slide device, which includes a lower rail fixed to a vehicle floor and an upper rail fixed to a vehicle seat and slidably supported by the lower rail. The lower and upper rails are relatively slidable in a vehicle longitudinal direction by driving a motor so that the forward and backward positions of the vehicle seat can be adjusted.

In this type seat slide device, the lower rail is fixed to the vehicle floor by means of nut member and a screw shaft is engaged with the nut member. The screw shaft extends in a longitudinal direction of the rails and is rotatably supported on the upper rail. The rotational force is transmitted from the motor to the screw shaft through a gear device provided on a front end of the upper rail. This structure causes a slidable movement of the upper rail relative to the lower rail by rotating the screw shaft by the rotational force from the motor.

In the conventional device, upon a vehicle collision accident, such as an rear-end collision, a vehicle seat receives a large load in front and backward direction due to the inertia caused by the vehicle seat itself and an occupant thereon by the impact of the collision. This large load is transmitted from the upper rail which supports the vehicle seat to the lower rail through the gear device provided on the front end of the upper rail, the screw shaft connected to the gear device and the nut member engaged with the screw shaft. The gear device mainly receives the load due to the structural reasons. This disadvantage is one of the issues to be improved and various improvements therefor have been proposed to avoid such load concentration on the gear device.

For example, a power seat device proposed in the Patent Document 1 listed below is provided with an accommodation portion for accommodating the gear case at the front end of the upper rail. The gear case is accommodated in the accommodation portion by a support bracket to fixedly support the gear case in front and backward directions so that the bracket receives the load applied on the gear case.

Another improvement is proposed in the Patent Document 2. In this device both sidewalls of the upper rail are bent inward with a predetermined width to form a concave portion and a pair of washers are provided at the screw shaft to be in contact with the walls of the concave portion in a front and backward direction. The load applied on the gear case is received by the two washers, which are in contact with the concave portion of the upper rail.

Patent Document 1: Japanese utility model 7-345
Patent Document 2: Japanese Patent 2002-192996 A The device in the Patent Document 1, since the front end of the upper rail has to be extended and to be swollen to form the accommodation portion. This needs a press machining process instead of a simple roll forming. The press machining requires a very high degree of accuracy not to influence upon the accuracy of flatness of the sliding surface with the lower rail. In addition, the weight of the upper rail may increase which eventually leads to the increase of manufacturing cost.

In the device in the Patent Document 2, in order to secure a space between the washers, a collar member has to be inserted between the washers, which leads to the increase of the number of parts and assembling process. In addition, a small clearance between the washers and the concave portion is needed which requires a high degree of accuracy. These will lead to the increase of manufacturing cost. The upper rail has to be formed by press machining as like the upper rail in the Patent Document 1.

The present invention has been made in view of the above circumstances and an object of the invention is to reduce the concentration of the load applied to the gear device when a large load is applied thereto such as, upon a vehicle collision, to tightly hold the gear device.

SUMMARY OF THE INVENTION

According to an aspect of the invention, a seat slide device includes a lower rail fixed to a vehicle floor, an upper rail fixed to a support bracket supporting a vehicle seat and slidably supported on the lower rail, a nut member fixed to the lower rail and a screw shaft engaged with the nut member and rotatably supported on the upper rail. The seat slide device further includes a gear device supported on a front end of the upper rail through support bracket for supporting the gear case to transmit a rotational force from a drive device including a motor to the screw shaft. The upper rail is movable relative to the lower rail in front and backward direction of the vehicle seat by the engagement of the screw shaft with the nut member. The holding bracket is fixed to the upper rail and the support bracket and holds a gear case of the gear device over the entire circumferential area of the gear case both on front and rear surfaces and the upper and lower surfaces.

According to another aspect of the invention, the holding bracket holds the gear case of the gear device of the seat slide device at the front and rear side surfaces and the lower surface. The support bracket holds the lower surface of the gear case.

According to a further aspect of the invention, the gear case includes at least one of an upper projecting portion extending upwardly from the upper surface and a lower projecting portion extending downwardly from the lower surface and at least one of the upper and lower projecting portions serve as an engaging portion. At least one of the support and holding brackets is provided with a slit hole for positioning the gear case in a width direction of the vehicle seat (right and left direction) by engaging with the engaging portion.

According to still further aspect of the invention, the gear case is divided into two parts, first case and the second case. A ring member is provided between the first and the second cases to inseparably assemble the two cases.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
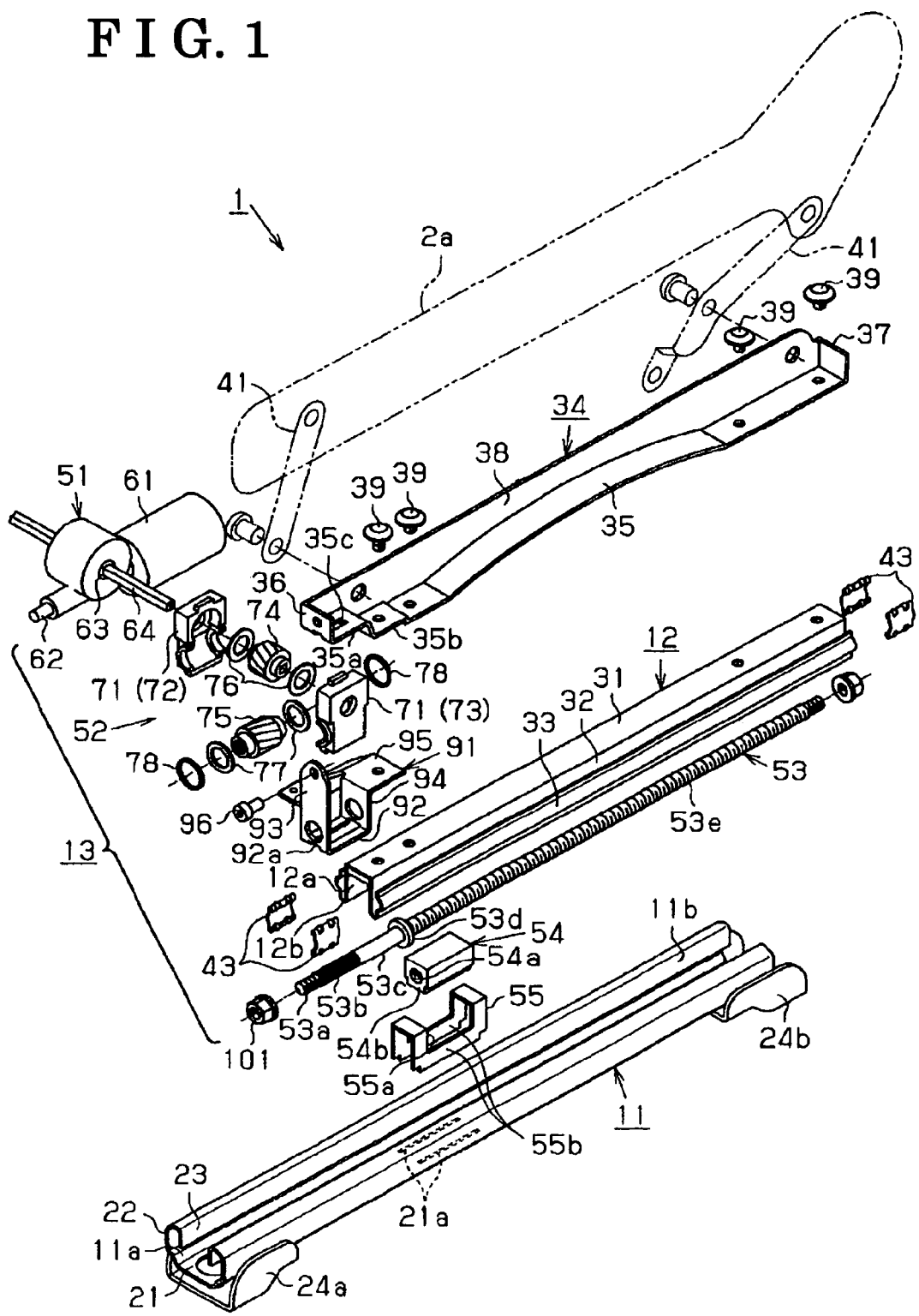
FIG. 1 is an exploded perspective view of a seat slide device according to a first embodiment of the present invention.
Figure 2:
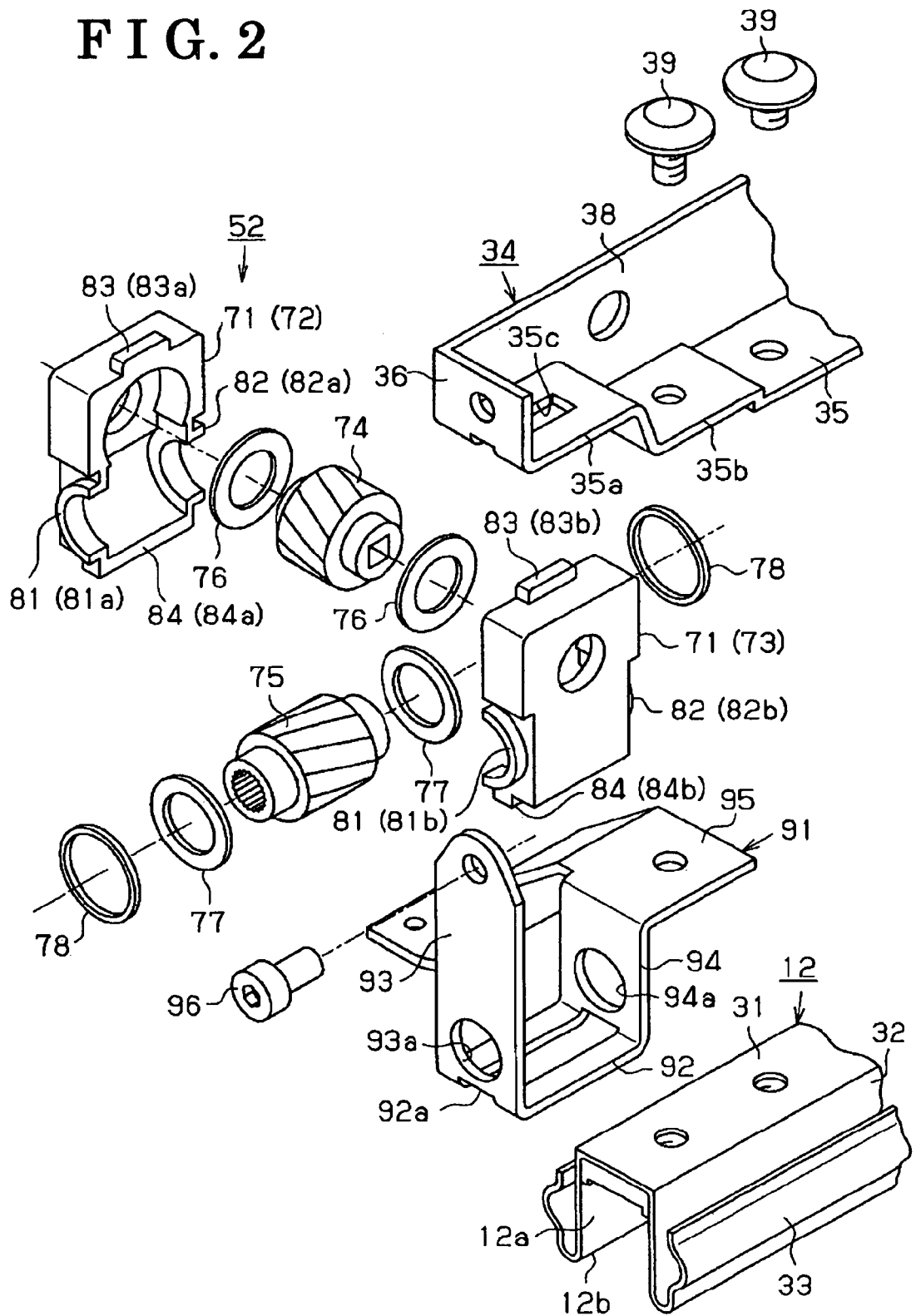
FIG. 2 is an exploded perspective view, partially enlarged a portion of FIG. 1.
Figure 3:
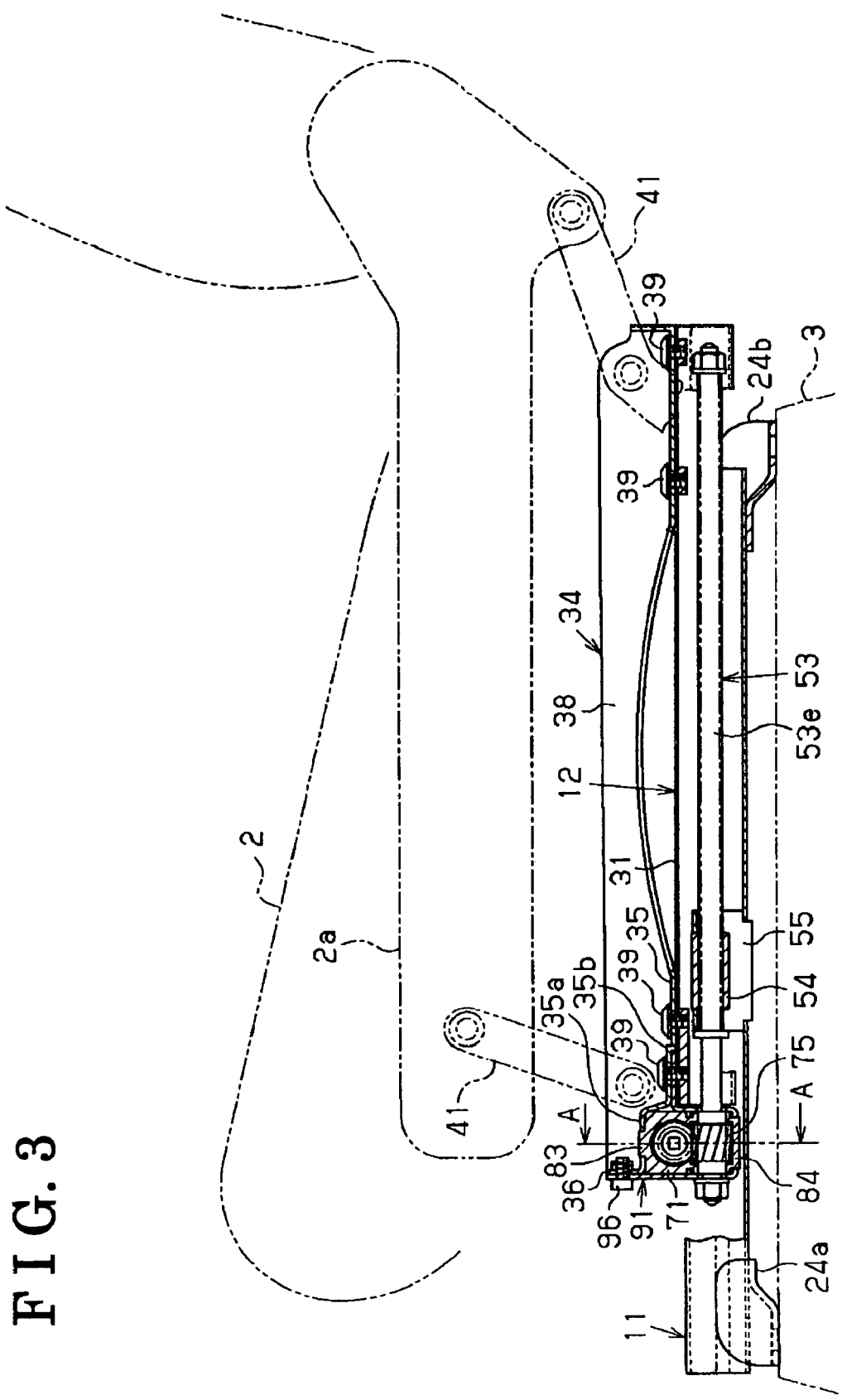
FIG. 3 is a cross sectional view illustrating a seat slide device of the invention installed in a vehicle.
Figure 4:
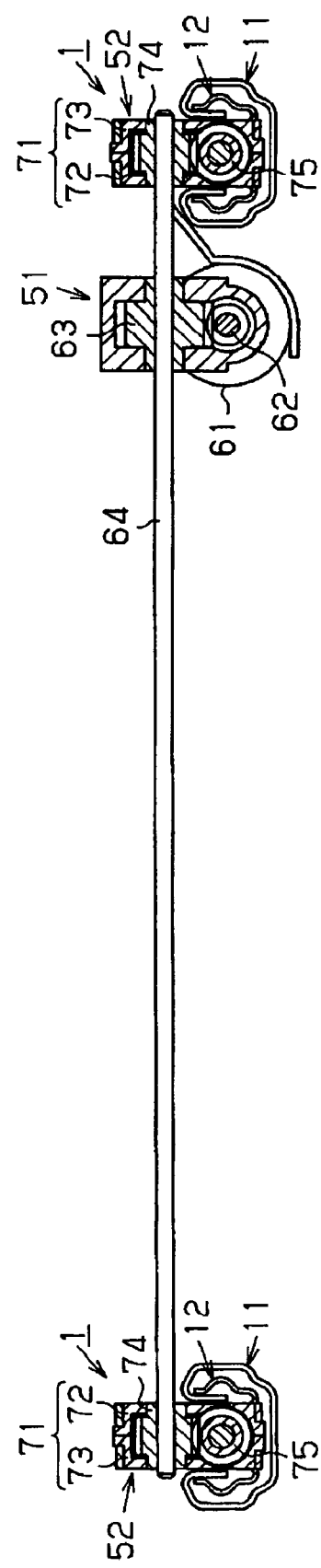
FIG. 4 is a cross sectional view along the line A-A of FIG. 3.

Referring now to one embodiment of the invention with reference to FIGS. 1 to 5, particularly in FIG. 1, the seat slide device 1 includes a lower rail 11, an upper rail 12 and a drive mechanism 13. The seat slide device 1 is arranged at both sides (right and left sides) of the vehicle seat. FIG. 4 illustrates two devices 1, 1 and similarly, the upper and lower rails also are arranged in parallel at both sides of the seat. A drive device 51 (a power source) including motor 61 is used for the two seat slide devices 1, 1 and accordingly only one is provided in the embodiment. The words "right and left" "front and back" and "upper and lower" mean all with respect to the vehicle or the vehicle seat in this specification. For example, "right and left" means right and left side of the vehicle or the vehicle seat with respect to the forward direction of the vehicle. The description will be made only one of the right and left side seat slide devices 1, mostly for the left side device, because both have a symmetric structure.

The lower rail 11 is of an elongated shape extending in front and backward direction of the vehicle and having a U-shape in cross section. The lower rail 11 includes a bottom wall 21, a pair of vertical walls (side walls) 22 each extending upwardly from each end of the bottom wall 21. Each upper end of the vertical walls 22 is bent inwardly to form a flange wall 23. Accordingly, the lower rail 11 includes an inner space 11a enclosed by the vertical walls 22 and the bottom wall 21 and extending in the front and backward direction and an opening 11b open upwardly from the inner space 11a.

As illustrated in FIG. 1, the bottom wall 21 of the lower rail 11 is attached to brackets 24a; 24b by rivets (not shown). The lower rail 11 is fixed to a vehicle floor 3 (shown in FIG. 3) through these brackets 24a and 24b.

The upper rail 12 is of an elongated shape extending in front and backward direction of the vehicle and having a reverse U-shape in cross section. The upper rail 12 includes an upper wall 31 and a pair of vertical walls 32 each extending downwardly from each end of the upper wall 31. Each lower end of the vertical walls 32 is bent outwardly to form a flange wall 33. Accordingly, the upper rail 12 includes an inner space 12a enclosed by the vertical walls 32 and the upper wall 31 and extending in the front and backward direction and an opening 12b open downwardly from the inner space 12a.

The upper wall 31 of the upper rail 12 is fixed to a support bracket 34, which supports a lower frame 2a of the vehicle seat 2. The support bracket 34 is of an elongated shape and includes a bottom wall 35, a front wall 36, a rear wall 37 and a sidewall 38. The length of the support bracket 34 is about the same length as that of upper rail 12 in vehicle front and backward direction.

In more detail, as shown in FIG. 3, the bottom wall 35 of the support bracket 34 is formed with step portions 35a and 35b. The support bracket 34 is fixed to the upper wall 31 of the upper rail 12 at the four portions of the bottom wall 35 including the step portion 35b through four bolts 39. A link member 41 is rotatably supported on the sidewall 38 of the support bracket 34. The link member 41 supports a lower frame 2a of the vehicle seat 2 to partially form a vertical adjustment mechanism (not shown) for the vehicle seat 2. The link member 41 is rotated by the operation of the vertical adjustment mechanism to adjust the vertical position of the vehicle seat 2 relative to the vehicle floor 3. It is possible to eliminate vertical adjustment mechanism (link member 41) and instead the lower frame 2a of the vehicle seat 2 can be directly fixed to the support bracket 34.

As shown in FIG. 1, a slit hole 35c is provided in the step portion 35a of the bottom wall 35 extending from the lower end of the front wall 36 of the support bracket 34. The slit hole 35c is provided in the step portion 35a from the center to the front side with a rectangular shape elongated in front and backward direction. This slit hole is engaged with an upper concave portion 83 (see FIG. 2) of the gear case 71 to define the position of the gear case 71 in right and left direction (to prevent the right and leftward movement of the gear case)

The flange walls 33 of the upper rail 12 are engaged with the flange walls 23 of the lower rail 11 via a sliding member 43. Under this structure, the upper rail 12 is supported on the lower rail 11 to be slidable within the inner space 11a of the lower rail 11 in longitudinal direction of the rails (in front and backward direction).

The drive mechanism 13 includes the drive device 51, the gear device 52, the screw shaft 53 and the nut member 54. The drive device 51 includes the motor 61, a reduction gear mechanism formed by a worm gear 62 connected to a motor shaft of the motor for unitary rotation therewith and a worm wheel 63, and a connecting rod 64. The rotational force of the worm wheel 62 is reduced through the worm wheel 63 and transmitted to the connecting rod 64.

The gear device 52 includes the gear case 71 formed by the first case 72 and the second case 73, an input gear 74 and an output gear 75 both being accommodated in the gear case 71, a pair of washers 76, 77 accommodated in the gear case 71 for receiving a thrust force at each end of the input and out put gears 74, 75 and a pair of ring members 78 for inseparably assembling the first and the second cases 72 and 73.

Spiral wheels are used for the input and output gears 74 and 75. These spiral wheels are formed to have a spiral angle of about 45 degrees. The input and output gears are assembled to have a shaft angle of about 90 degrees. The input gear 74 is connected to the connecting rod 64 of the drive device 51 for transmitting the rotational force reduced by the worm gear 62 and the worm wheel 63 to the output gear 75. The connecting rod 64 is connected to each input gear 74 of the two gear devices 52 arranged at right and left sides (shown in FIG. 4). The gear device 52 functions as a converting mechanism for converting a rotational movement about the rotation axis extending in right and left direction to a rotational movement about the rotation axis extending in front and backward direction.

The gear case 71 is a housing of rectangular parallelepiped shape and is divided into two parts, the first and the second cases 72 and 73 at the central portion of the gear case 71. Both case parts are symmetric. As shown in FIG. 2, The lower portion of the front side of each case 72 and 73 and the lower portion of the rear side of each case 72 and 73 are formed with half ring shaped flange portions 81a, 81b and 82a, 82b, respectively. These half ring shaped flange portions 81a, 81b and 82a, 82b serve as a bearing function for the output gear 75. When the first and the second cases are assembled, the corresponding opposed surfaces of each case are faced with each other to form ring shaped flange portions 81, 82 with consecutive circumferential surface. The gear case 71 is assembled inseparably by engaging the flange portions 81, 82 with the ring members 78.

The first and the second cases 72 and 73 are provided with upper projecting portions 83a, 83b extending upwardly from the upper surface and lower projecting portions 84*a*, 84*b* extending downward from the lower surface. When the tow cases 71 and 73 are assembled, the corresponding opposed sides are faced to each other to form one single upper projection 83 and one single lower projection 84. In this embodiment, the upper and lower projections 83, 84 form engaging portions respectively.

The holding bracket 91 supports the gear device 52 (gear case 71) at the front end of the upper rail 12. In more detail, as shown in FIG. 2, the holding bracket 91 includes a bottom wall 92, a front and rear walls 93, 94 extending upwardly from each front and rear end of the bottom wall 92 and a flange wall 95 extending rearward from the upper end of the rear wall. The bottom wall and the front and rear walls form an approximately U-shaped supporting portion. The holding bracket 91 supports the gear device 52 by contacting the front side surface, rear side surface and bottom side surface of the gear case 71 with the front wall 93, rear wall 94 and the bottom wall 92, respectively.

The bottom wall 92 of the holding bracket 91 is formed with a rectangular shaped slit hole 92*a* extending from the front wall 93 to the rear wall 94 in front and backward direction. This slit hole 92*a* engages with the lower projection 84 of the gear case 71. In other words, the engagement of the lower projection 84 with the slit hole 92*a* defines the position of the gear case 71 relative to the holding bracket 91 in right and left direction (movement of gear case in right and left directions being prevented). In order to avoid interference between the ring members 78 inserted into the flange portions 81, 82 and the bottom wall 92, the slit hole 92*a* is formed from the front wall side to the rear wall side. The front wall 93 and the rear wall 94 of the holding bracket 91 are provided with insertion holes 93*a* and 93*b*, respectively for inserting the screw shaft 53.

The holding bracket 91 is fixed to the upper rail 12 and the support bracket 34 by placing the flange portion 95 between the upper wall 31 of the upper rail 12 and the step portion 35*b* formed at the bottom wall 35 of the support bracket 34. Further, the holding bracket 91 is fixed to the front wall 36 of the support bracket 34 at the upper end of the front wall 93 by means of a bolt 96.

Figure 5:
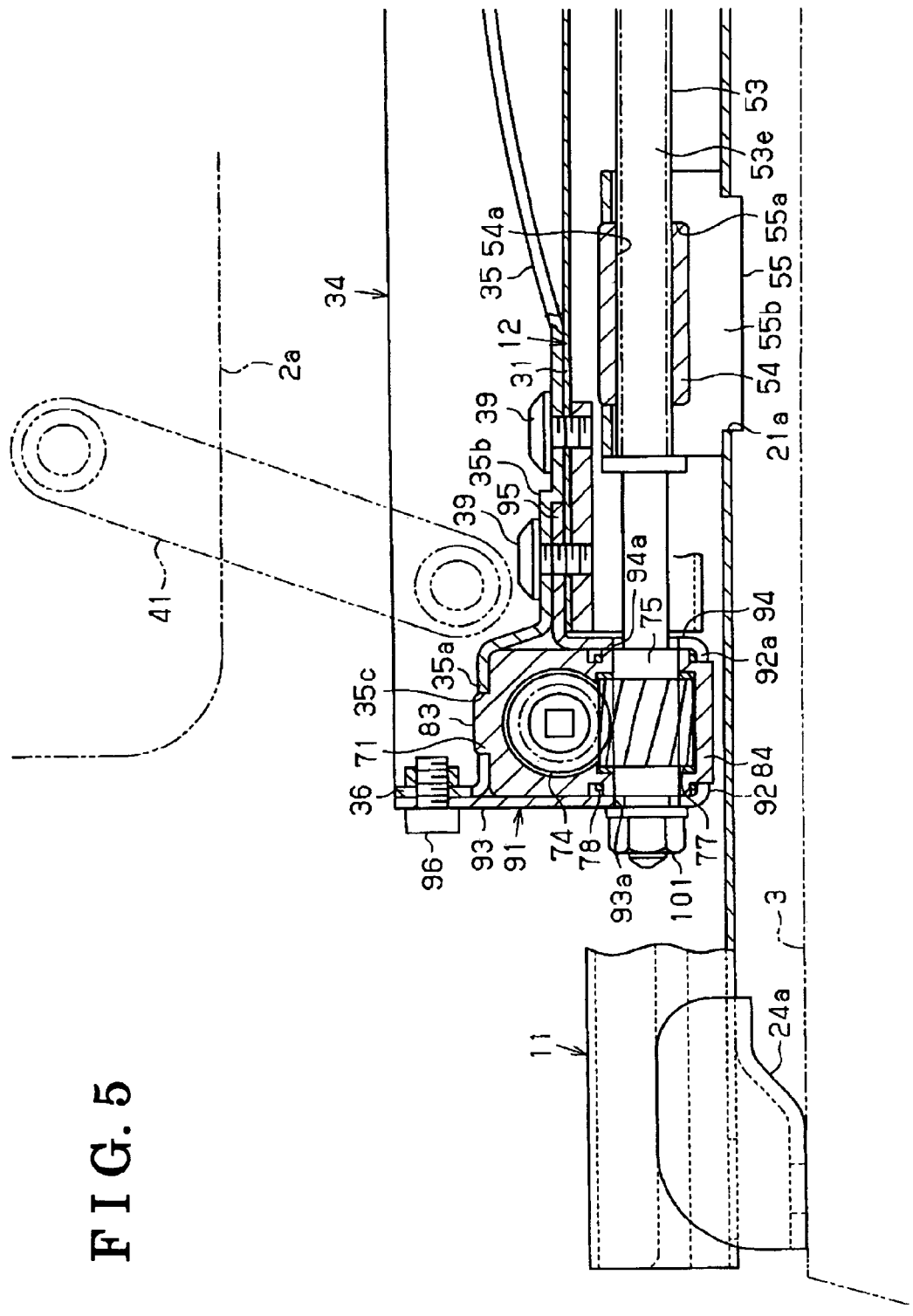
FIG. 5 is a partially enlarged cross sectional view of FIG. 3.

As illustrated in FIG. 5, the holding bracket 91 supports the gear case 71 (at front wall 93, rear wall 94 and the bottom wall 92) at the front and rear surfaces and the lower surface of the case 71. The upper surface of the gear case 71 is supported by the support bracket (at the step portion 35*a* of the bottom wall 35). Approximately entire circumferential area (front, rear, upper and lower surfaces) of the gear case 71 is supported by the support bracket 34 and holding bracket 91. In addition, the right and leftward movement relative to the brackets 34 and 91 of the gear case 71 is restricted by engaging the upper and lower projections 83 and 84 with the slit hole 35*c* of the support bracket 34 and the slit hole 92*a* of the holding bracket 91.

The screw shaft 53 is of rod shape formed by a metal material and extending into the inner spaces 11*a* and 12*a* of the lower and upper rails 11, 12 in longitudinal direction (in sliding direction of upper rail 11).

In more detail, the screw shaft 53 is provided with a screw portion 53*a* at the front end (where the gear device is provided). The screw portion 53*a* is a male screw formed from the front end on the circumferential portion. The screw shaft 53 further includes a serrated portion 53*b* and column portion 53*c* having no screwed nor serrated portion on the circumferential portion. The screw shaft 53 further includes a large diameter contact portion 53*d* behind the column portion 53*c* and another male screwed portion 53*e* behind the large diameter contact portion 53*d* toward the other end of the shaft on the circumferential portion. The large diameter contact portion 53*d* contacts with a front end surface of a nut-supporting member 55, which will be explained later in detail, to restrict the rearward movement of the upper rail 12.

This screw shaft 53 is rotatably supported by the gear device 52 by engaging the serrated portion 53*b* with the output gear 75. The screw shaft is secured to the gear device 52 by engaging the screw portion 53*a* with an attachment nut 101 through the front wall 93 of the holding bracket 91.

The nut member 54 is made by a resin material such as 66-nylon with glass fiber and includes a female screw portion 54*a* engaged with a male screw portion 53*e* of the shaft 53 and a projection 54*b* extending downward from the lower surface. The nut member 54 is fixed to the bottom wall 21 of the lower rail 11 through the nut-supporting member 55. In more detail, the nut member 54 is engaged with a recess 55*a* provided on the nut-supporting member 55. The projection 54*b* of the nut member 54 engages with the sidewalls 55*b* of the nut-supporting member 55. Thus the nut member 54 is fixed to the nut-supporting member 55 not to move in any direction (front, rear, upper, lower, right and left directions). The nut supporting member 55 is fixed to the lower rail 11 by engaging the lower end with an insertion hole 21*a* provided at the bottom wall 21 of the lower rail 11.

Now explaining the function of the seat slide device according to the embodiment: When the motor 61 is actuated, the rotational force is transmitted to the screw shaft 53 via reduction mechanism (worm gear 62 and worm wheel 63), connecting rod 64 and the gear device 52. Thus the screw shaft 53 is rotated. Since the nut member 54 geared with the screw shaft 53 is fixed to the lower rail 11 via the nut-supporting member 55, the screw shaft 53 moves in axial direction relative to the nut member 54. As a result, the upper rail 12, which supports the screw shaft 53, slides in the lower rail in front and backward direction to eventually adjust the front and backward position of the vehicle seat on the upper rail relative to the vehicle floor 2.

When an accident, such as a vehicle collision occurs, a large load is applied on the vehicle seat 2 in front and backward direction and the load is then transmitted to the gear device 52. The load applied on the gear device 52 is received by the holding bracket 91 and the support bracket 34, which support the entire circumferential area (front, rear, upper and lower surfaces) of the gear case 71 of the gear device 52. This will release the load on the gear case 71 to tightly secure the gear case against the load. At this time, a force to divide the gear case 71 in right and left directions is applied, but such force is received by the ring members 78, the slit hole 35*c* of the support bracket 34 engaged with the upper projection 83 of the gear case 71 and the slit hole 92*a* of the holding bracket 91 engaged with the lower projection 84 of the gear case to tightly secure the gear case 71 against such force. This will prevent the separation of the gear case 71 in right and left directions.

As mentioned above, according to the embodiment of the invention, the following issues may be pointed out:

First, the holding bracket 91 is fixed to the upper rail 12 and the support bracket 34 and supports the gear case 71 in entire circumferential area thereof in cooperation with the support bracket. This will reduce the large load applied on the gear case 71 upon collision accident by receiving the load at the brackets 34 and 91 to tightly secure the gear case (gear device 52) against such large load.

Secondly, the gear case 71 is provided with lower projection 84 at the lower surface and the holding bracket 91 is provided with a slit hole 92*a* which engages with the projection 84 to define the position of the gear case 71 in the right and leftward direction (in width direction of the seat) not to be separated when received any undesired large load.

The gear case 71 is provided with an upper projection 83 at the upper surface and the support bracket 34 is provided with a slit hole 35c, which engages with the projection 83 to define the position of the gear case 71 in the right and leftward direction not to be separated when received any undesired large load.

The slit hole 35c of the support bracket 34 is formed up to the front end of the bracket 34 (front wall 36 side). This can facilitate the fixing process of the holding bracket 91 to the upper rail 12 and the support bracket 34 with support bracket being fixed to the upper rail 12. Accordingly, the assembling of the gear device 52 can be easily performed by first prefixing the support bracket 34 to the upper rail 12 by the three bolts 39, then slidably inserting the upper projection 83 of the gear device 52 supported by the holding bracket 91 into the slit hole 35c of the support bracket 34 from the front side of the rail and finally placing the flange wall 95 of the holding bracket 91 between the step portion 35b of the support bracket 34 and the upper wall 31 of the upper rail 12 and fixing the holding bracket 91 to the support bracket 34 and the upper rail 12 by fastening the bolt 39 at front side and fixing the front wall 93 of the holding bracket 91 to the front wall 36 of the support bracket 34 by fastening the bolts 96. Thus, from the condition that the support bracket 34 being pre-fixed to the upper rail, sliding the holding bracket 91 can assemble the gear device 52.

Since the support bracket 91 does not have the right and left side walls (open in the right and left side direction), the width of the gear case 71 in the right and left direction can be adjusted to approximately the same width of the opening 11b of the lower rail 11 to minimize the width of the rail. This can minimize the whole size of the seat slide device.

Since there is no particular machining, such as press machining to elongate the front end, or swelling and bending processes as needed in the conventional device, the weight of the rail can be reduced and the cost of manufacturing can be also reduced. The support bracket 34 can be used commonly with the hitherto needed bracket to attach the upper rail to the vehicle seat 2 so that increase of the number of parts can be refrained.

Another embodiment as follow may be implemented according to the invention: in the explained embodiment, the gear case 71 is supported by the holding bracket at the front and rear and lower surfaces and the upper surface is supported by the support bracket. This supporting condition of the gear case 71 can be changed as long as the gear case is supported at the front, rear, upper and lower surfaces (approximately on entire circumferential area of the case) in cooperation of the two brackets 34 and 91.

In the embodiment, two projections 83 and 84 are formed on the gear case 71, but only one (either upper or lower projection) can be provided. The position or the shape of such projections may be changed as long as the right and left position of the gear case can be defined. For example, the projections may be provided on front and rear side of the gear case which are engaged with slit holes with key provided in the front and rear wall 93, 94 of the holding bracket.

The shape of the holding bracket 91 can be changed from the open type opening to the right and left directions to wall type having walls at both sides. The three fixing bolts 39 fixing the support bracket 34 to the upper rail may be changed to rivets or the like.

According to the first aspect of the invention, the gear case is supported tightly even when a large load is applied thereto upon a collision by receiving the large load at the support bracket and the holding bracket, which tightly hold the gear case at the entire circumferential area of the gear case. Further, according to this aspect of the invention, the gear case and the gear device are attached easily to the upper rail without any special machining process. This will lead to the cost reduction of manufacturing the upper rail. Further, the support bracket for holding the gear case in cooperation with the holding bracket is commonly used for attaching the upper rail to the vehicle seat and accordingly, the number of parts for the seat slide device will not increase.

According to the second aspect of the invention, the holding bracket can be fixed to the support bracket and the upper rail under the gear case being held by the holding bracket. This will simplify the assembling of the gear device to the seat slide device.

According to the third aspect of the invention, the position of the gear case in the right and left direction can be achieved by the engagement of the engaging portion and the slit hole.

According to the fourth aspect of the invention, the divided two gear cases can be tightly connected to each other not to be separated in right and left directions by means of the ring member.

The principles, the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat slide device comprising a lower rail fixed to a floor, a support bracket for supporting a seat, an upper rail fixed to the support bracket and slidably supported on the lower rail relative to the lower rail, a nut member fixed to the lower rail, a screw shaft engageable with the nut member and rotatably supported on the upper rail and a gear device supported on one end of the upper rail through a holding bracket to transmit a rotational force from a power source to the screw shaft, the upper rail being movable relative to the lower rail in a front and backward direction relative to the seat by the engagement of the screw shaft with the nut member, wherein the holding bracket is fixed to the upper rail and the support bracket for supporting a gear case of the gear device over a circumferential area of the gear case on front, rear, upper and lower surfaces in cooperation with the support bracket;

wherein the gear case is provided with a first engaging portion which is formed on at least one of the upper surface projecting upwardly from the upper surface and the lower surface projecting downwardly from the lower surface and at least one of the support bracket and the holding bracket is provided with a second engaging portion to be engaged with the first engaging portion provided on the gear case to define a position of the gear case in width direction relative to the seat; and wherein the first engaging portion is provided both on the upper surface projecting upwardly from the upper surface and on the lower surface projecting downwardly from the lower surface and the second engaging portion is a slit hole provided both at the first and the second support brackets to be engaged with the first engaging portion on the gear case to define the position of the gear case in width direction relative to the seat.

2. A seat slide device comprising a lower rail fixed to a floor, a support bracket for supporting a seat, an upper rail fixed to the support bracket and slidably supported on the lower rail relative to the lower rail, a nut member fixed to the lower rail, a screw shaft engageable with the nut member and rotatably supported on the upper rail and a gear device supported on one end of the upper rail through a holding bracket to transmit a rotational force from a power source to the screw shaft, the upper rail being movable relative to the lower rail in a front and backward direction relative to the seat by the engagement of the screw shaft with the nut member, wherein the holding bracket is fixed to the upper rail and the support bracket for supporting a gear case of the gear device over a circumferential area of the gear case on front, rear, upper and lower surfaces in cooperation with the support bracket;

wherein the gear case is provided with a first case and a second case separated at the center of the gear case and a ring member is provided to inseparably assemble the first and the second cases.

3. The seat slide device according to claim 1, wherein the gear case is provided with a first case and a second case separated at the center of the gear case and a ring member is provided to inseparably assemble the first and the second cases.

4. A seat slide device comprising a lower rail fixed to a floor, a support bracket for supporting a seat, an upper rail fixed to the support bracket and slidably supported on the lower rail relative to the lower rail, a nut member fixed to the lower rail, a screw shaft engageable with the nut member and rotatably supported on the upper rail and a gear device supported on one end of the upper rail through a holding bracket to transmit a rotational force from a power source to the screw shaft, the upper rail being movable relative to the lower rail in a front and backward direction relative to the seat by the engagement of the screw shaft with the nut member, wherein the holding bracket is fixed to the upper rail and the support bracket for supporting a gear case of the gear device over a circumferential area of the gear case on front, rear, upper and lower surfaces in cooperation with the support bracket;

wherein the holding bracket and the support bracket partially overlap and are fixed to each other; and wherein the gear case is provided with a first engaging portion which is formed on at least one of the upper surface projecting upwardly from the upper surface and the lower surface projecting downwardly from the lower surface and at least one of the support bracket and the holding bracket is provided with a second engaging portion to be engaged with the first engaging portion provided on the gear case to define a position of the gear case in width direction relative to the seat.

5. The seat slide device according to claim 4, wherein the first engaging portion is provided both on the upper surface projecting upwardly from the upper surface and on the lower surface projecting downwardly from the lower surface and the second engaging portion is a slit hole provided both at the first and the second support brackets to be engaged with the first engaging portion on the gear case to define the position of the gear case in width direction relative to the seat.

6. The seat slide device according to claim 5, wherein the gear case is provided with a first case and a second case separated at the center of the gear case and a ring member is provided to inseparably assemble the first and the second cases.

7. The seat slide device according to claim 5, wherein the holding bracket supports the gear case of the gear device on the front, rear and lower surfaces of the gear case and the support bracket supports the gear case on the upper surface of the gear case.

8. The seat slide device according to claim 1, wherein the holding bracket supports the gear case of the gear device on the front, rear and lower surfaces of the gear case and the support bracket supports the gear case on the upper surface of the gear case.

* * * * *